United States Patent [19]

Lee

[11] Patent Number: 5,347,518
[45] Date of Patent: Sep. 13, 1994

[54] METHOD OF AUTOMATING A BUILD VERIFICATION PROCESS

[75] Inventor: Adrienne Y. Lee, Grapevine, Tex.

[73] Assignee: International Business Machines Corporation, Armonk, N.Y.

[21] Appl. No.: 42,843

[22] Filed: Apr. 6, 1993

Related U.S. Application Data

[63] Continuation of Ser. No. 634,280, Dec. 21, 1990, abandoned.

[51] Int. Cl.$^5$ .............................................. G06F 11/00
[52] U.S. Cl. ........................................ 371/19; 395/500;
 395/600; 364/DIG. 1; 364/285.4
[58] Field of Search ................... 364/DIG. 1, DIG. 2;
 395/500, 575, 600, 700; 371/19

[56] References Cited

U.S. PATENT DOCUMENTS

| | | | |
|---|---|---|---|
| 4,595,980 | 6/1986 | Innes | 395/575 |
| 4,595,981 | 6/1986 | Leung | 395/575 |
| 4,617,663 | 10/1986 | Lake et al. | 371/19 |
| 4,639,916 | 1/1987 | Boutterin et al. | 395/575 |
| 4,696,003 | 9/1987 | Kerr et al. | 371/19 |
| 4,916,610 | 4/1990 | Bapat | 395/700 |
| 4,970,639 | 11/1990 | Diefendorf et al. | 395/700 |
| 5,021,997 | 6/1991 | Archie et al. | 395/575 |
| 5,022,028 | 6/1991 | Edmonds et al. | 371/19 |
| 5,086,393 | 2/1992 | Kerr et al. | 371/19 |
| 5,157,779 | 10/1992 | Washburn et al. | 371/19 |
| 5,157,782 | 10/1992 | Tuttle et al. | 395/575 |

OTHER PUBLICATIONS

Simrin, "The Waise Group's MS-DOS Bible", 1988, pp. 63–66.
"IBM Office Vision/VM Getting Started with the Professional Office System", 1989.

Primary Examiner—Paul V. Kulik
Assistant Examiner—John C. Loomis
Attorney, Agent, or Firm—David A. Mims, Jr.

[57] ABSTRACT

A method of automating a build verification procedure for panels executable in a Multiple Virtual Storage (MVS) environment which contains fast path commands. Fast path commands are commands that are entered by a user to go directly to panels/options they want. Ideally, a test of the commands should occur in the environment for which they were created. A terminal network simulation tool is used to create a model of the panels/options to be verified. The network simulation tool is used to automatically establish a multiple virtual storage terminal session linked to the model. The sequential application of a plurality of fast path commands is automatically applied against the model and the results recorded.

9 Claims, 9 Drawing Sheets

```
LGL ─╱─50                SELECT GIL RECORDS
              52⌐
Enter criteria for selection, or leave blank to display all records:

Record type ..: 6 ◄───
              ╱ 1=Information
             ╱
                2=Menu 3=Document type description    (Document Composition only)
       53 ⎰    4=Standard paragraph group     (Document Composition only)
          ⎱    5=Standard paragraph           (Document Composition only)
                6=Application type description
             ╲  7=Parameter description
                8=DCF profile                  (Document Composition only)
                9=User registration Record name......:

Record status.....:

Record owner .....:

Modification date:

PF1=Help    2=       3=       4=       5=       6=
PF7=        8=       9=      10=      11=      12=Quit

SB=LT-1
```

Fig. 2 — DISPLAY SCREEN

```
ADM                OfficeVision/MVS Main Menu

Type an option number or a fast-path command, then press ENTER

1 Office Services    Mail, structured and individual correspondence,
                        address book, calendar
   2 Decision Support   Database query, reports, statistical
                        analysis, TSO file transfer
   3 Applications       Additional applications
   4 Bulletin Board     News
   5 Administration     User profile, defaults, administrator functions PF1=Help    2=         3=         4=         5=          6=Fast Path
PF7=        8=         9=Print    10=        11=         12=Quit
===>
SB=LT-1
```

Fig. 7 — DISPLAY SCREEN

|                    | GIL RECORD LIST                              | Page 2 of 10 |
|--------------------|----------------------------------------------|--------------|
| Record Name        | Type Record Description                      |              |
| 18 CED             | A    Change DisplayWrite/370 Defaults        |              |
| 19 CKY             | A    Change PF Key Settings                  |              |
| 20 CM              | A    Create a Message                        |              |
| 21 CN              | A    Create a Note                           |              |
| 22 COR             | A    Maintain Personal Services Resources    |              |
| 23 CPA             | A    Change Personal Address Book            |              |
| 24 CPF             | A    Create Pattern for Find                 |              |
| 25 CPT             | A    Create Pattern for Store                |              |
| 26 CPW             | A    Change DISOSS Password                  |              |
| 27 CQD             | A    Create Quick Document                   |              |
| 28 CUP             | A    Change Application Services Defaults    |              |
| 29 CXR             | A    Create External Document Reference      |              |
| 30 DA              | A    Start Lotus 1-2-3/M Directly            |              |
| 31 DDD0            | A    Work with DW/370 Master Transaction     |              |
| 32 DDD1            | A    Reset DW/370 Master Session             |              |
| 33 DWCED           | A    Change DisplayWrite/370 Defaults        |              |
| 34 DWCLS           | A    List DW/370 Lists                       |              |

PF1=Help   2=        3=         4=Main Menu   5=          6=Fast Path
PF7=       8=Forward 9=Print    10=           11=Update   12=Quit
===>
SB=LT-1

Fig. 9

```
DMDBNT10              NOTE      RECIPIENTS            Item    1 Of

Type the recipients below, then press PF3 to Edit Note

NICKNAME/
LISTNAME  CC  USER ID  ADDRESS  USER  NAME

PF1=Help       2=          3=Edit Note   4=         5=Cmd Line   6=
PF7=Backward   8=Forward   9=            10=Add Line  11=Del Line  12=Quit
DMDE0631 Bottom of recipient list
  ===>
SB=LT-1
```

DISPLAY SCREEN

*Fig. 10*

METHOD OF AUTOMATING A BUILD VERIFICATION PROCESS

This application is a continuation of Ser. No. 07/634,280, filed on Dec. 21, 1990, now abandoned.

CROSS REFERENCE TO RELATED APPLICATION

This application is related in subject matter to the following application filed concurrently herewith and assigned to a common assignee:

Application Ser. No. 07/634,279 filed by Lee entitled "Method of Automating Uploading of Help Panels".

The foregoing co-pending application is incorporated herein by reference.

FIELD OF THE INVENTION

This invention relates to the automation of manual tasks required for testing processes in a data processing system, and more particularly, to the automation of the build verification process in the data processing system through the use of the Teleprocessing Network Simulator (TPNS) terminal and network simulation tool.

BACKGROUND OF THE INVENTION

The automation of repetitive human tasks in a build verification process leads to increased productivity and improved quality. Build verification consists of determining whether proper functional operation is maintained after modules are linked together to create a product. The build verification process must be repeated following any change to any one of the individual modules comprising the product, thereby resulting in a large number of build verifications for even the simplest products.

The problem is further exacerbated when National Language Support (NLS) is required. Each English language panel must be translated to its foreign equivalent. For a product like OfficeVision/Multiple Virtual Support (OV/MVS), marketed by the International Business Machines Corporation (IBM Corp.), NLS required translations into over 19 foreign languages. OfficeVision/Multiple Virtual Support required many builds during the NLS translation task with build verification conducted by a tester manually stepping through the verification procedures. It should be recognized that build verification varies with the product under test thereby making the automation process even more difficult. For example, OfficeVision/Multiple Virtual Support is composed of Application System (AS), Personal Service (PS), and Calendar functions. Proper build verification, for NLS translation purposes, required the product be loaded into its working environment and the user displays checked using fast path commands. Fast path commands are commands that are entered by a user to go directly to panels/options they want, instead of going serially through all the panels/options available. It is in effect, a "short cut", permitting a user to directly access the final panel/option in a chain. OV/MVS required a tester check over 91 fast path commands for proper operation during the build verification process while the product was resident in its operating environment. Human errors often resulted when a tester failed to check one of these fast path commands. For OV/MVS, build verification required a tester spend at least fifteen minutes per language checking the fast path commands for approximately 10-25 builds per week with the resultant build verification consuming over three hours of a tester time.

Consequently, what is needed is a technique for automating the build verification procedure to insure that a complete and accurate check has been conducted in the shortest possible time.

SUMMARY OF THE INVENTION

This invention relates to a method of automating the build verification procedures for panels executable in a Multiple Virtual Storage (MVS) environment which contain fast path commands. Fast path commands are commands that are entered by a user to go directly to panels/options they want. Ideally, a test of the commands should occur in the environment for which they were created. A terminal network simulation tool is used to create a model of the panels/options to be verified. The network simulation tool is used to establish a multiple virtual storage terminal session linked to the model. The sequential application of a plurality of fast path commands is then applied against the model and the results recorded.

BRIEF DESCRIPTION OF THE DRAWINGS

FIG. 2 is a representation of a display screen generated by the CICS control program.

FIG. 7 is a representation of a display screen showing the Administrator panel.

FIGS. 8 and 9 are representations of display screens showing the information contained in the General Information Library.

FIG. 10 is a representation of a display screen showing the panel used by the end user to create notes.

DETAILED DESCRIPTION

Figure 1:
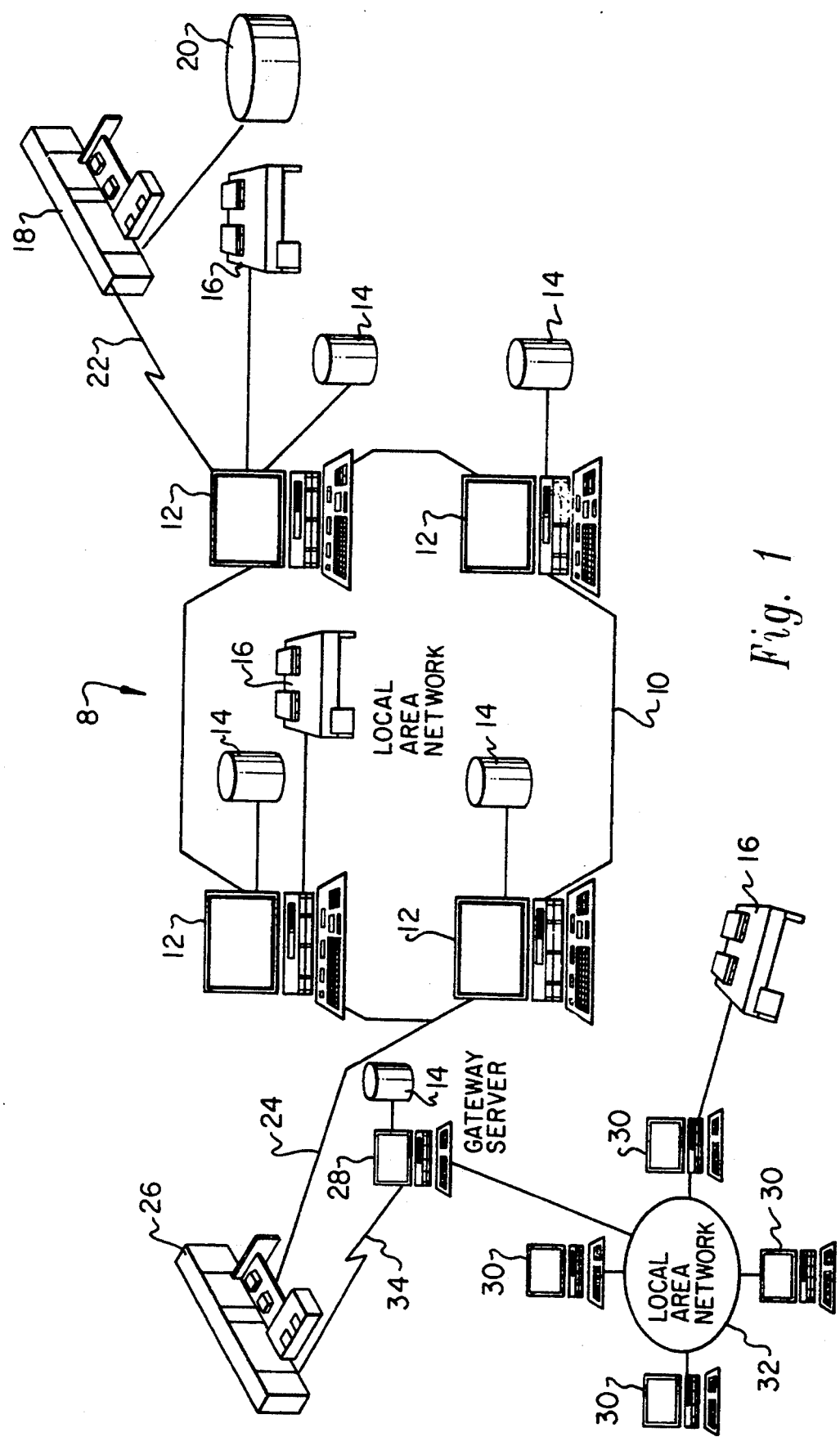
FIG. 1 is a block diagram of a System Configuration where this invention may be practiced.

Testing a system or a program against a predetermined series of data to arrive at a predictable result, serves the purpose of establishing the acceptability of a system or program. There are three general testing categories consisting of function testing, regression testing, and performance testing.

Function testing consists of testing new programs or subsystems (or testing a new component of an existing program or subsystem) to ensure that it performs according to specification. Test cases are prepared for each new function according to specification to ensure that new code does the job it was designed to do. The ultimate goal is to test all possibilities including user errors.

Regression testing consists of testing a modified program or subsystem to ensure that changes have not had an effect on the unmodified portions of the program or subsystem. This may include, for example, a determination of whether the parts of the program that were not changed still works the same. In regression testing, all of the test cases that were run against the unmodified program must be run against the modified program. Each test case must produce the same results as before. The ability to repeat a test case ensures that situations that caused errors can be duplicated—a condition often impossible when people carry out testing at terminals.

Performance testing refers to testing a system to ensure that it can handle the projected throughput with acceptable response times. Performance testing ensures that the appropriate number of terminals can be supported or the application programs can handle the anticipated transaction loads. Parameters such as the size and number of buffer pools maybe changed during performance testing to see what effect these changes have on the system. This is known as tuning the system. While all of the above categories have been addressed by various terminal and network stimulator tools, such as the IBM Teleprocessing Network Simulator, GH20-2487-4, which is incorporated herein by reference, heretofore no one has addressed the automation of the repetitive tasks involved in the above test categories.

One example of the repetitive tasks referred to above is found in the National Language Support process. Products providing NLS require all text displayed to the end user be translated to a target language. During the translation process, it is not uncommon to have between 10-25 builds each week for a given product. The development of OV/MVS, a software product created and marketed by the IBM Corp., is exemplary of the numerous builds required for NLS support. The manual process consisted of loading the product under the control of Customer Information Control System and testing over 91 fast path commands to determine if all functions were available. CICS is a database management software product available from IBM, Armonk, N.Y. which manages a network of terminals and other communications devices attached to a host processor. A description of the operation can be found in the CICS general information manual, GC33-0155-1, published by the IBM Corp. Under the manual process, the CICS would take control of OV/MVS to permit build verification by stepping through approximately 92 fast path commands. Fast path commands are commands that end users key on the command line to go directly to panels/options that they want instead of going through all the panels/options available. The number of fast path commands needed to be tested are application dependent and are determined by the system designers. Each fast path command is required to be tested to insure it is functional. The possibility existed that the tester would miss one of the fast path commands resulting in an inaccurate build. The end result to an end user of the OV/MVS product was abnormal ends (abends) and other error conditions. This invention automates the repetitive tasks required to perform a check of the fast path commands through the use of the TPNS program.

The TPNS program is a terminal and network simulation tool available from the IBM Corp., Armonk, N.Y. The tool has seen extensive use in the prior art as a functional, regression, and performance test tool. Versions of the tool are capable of running on any IBM host processor that supports MVS/370, MVS/XA ™, MVS/ESA ™ or any VM system that supports Group Control System (GCS). A more detailed description of the TPNS program is available in the TPNS general information manual, GH20-2487-4, which is incorporated herein by reference.

With reference now to the figures, and in particular with reference to FIG. 1, there is depicted a pictorial representation of data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or other programs which may be periodically accessed by any user within data processing system 8.

Still referring to FIG. 1, it may be seen that data processing network 8 may also include multiple main frame computers, such as main frame computer 18, which may be preferably coupled to LAN 10 by means of communications link 22. Main frame computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or Interactive Work Station (IWS) which serves to link LAN 32 to LAN 10.

As discussed above with respect to LAN 32 and LAN 10, applications or other programs may be stored within storage device 20 and controlled by main frame computer 18. Of course, those skilled in the art will appreciate that main frame computer 18 may be located a great geographic distance from LAN 10 and similarly LAN 10 may be located a substantial distance from LAN 32. That is, LAN 32 may be located in California while LAN 10 may be located within Texas and main frame computer 18 may be located in New York.

Still referring to FIG. 1, the library 20, is capable of being accessed flexibility and simultaneously by a plurality of users and therefore represents a common repository or shared resource. Unlike the shared library 20, a user's personal or private documents are stored in a local resource 14. This local storage resource 14 is usually not shared with other users.

Figure 3:
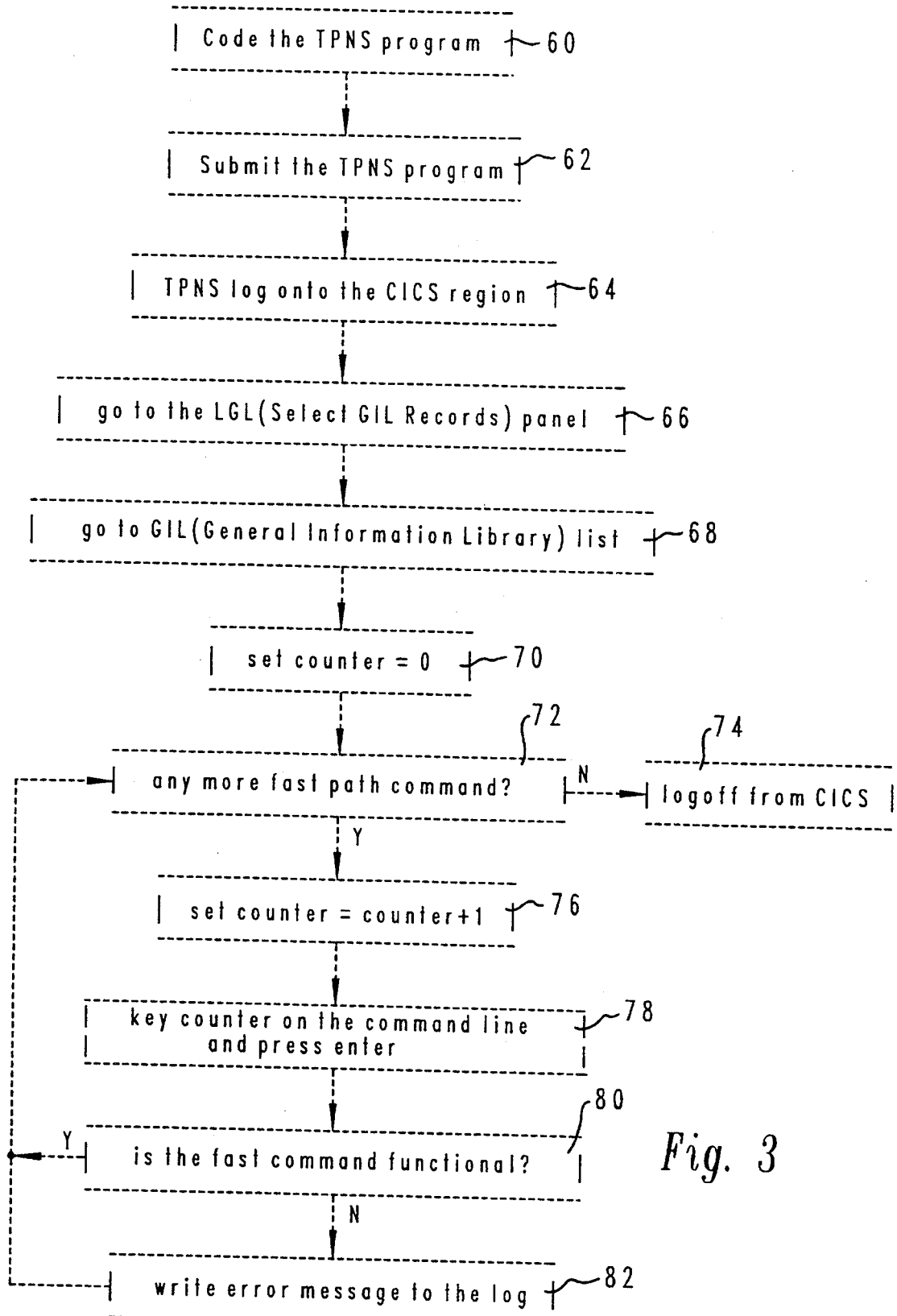
FIG. 3 is a flow diagram of the procedure required to automate the fast path commands build verification procedure.
Figure 8:
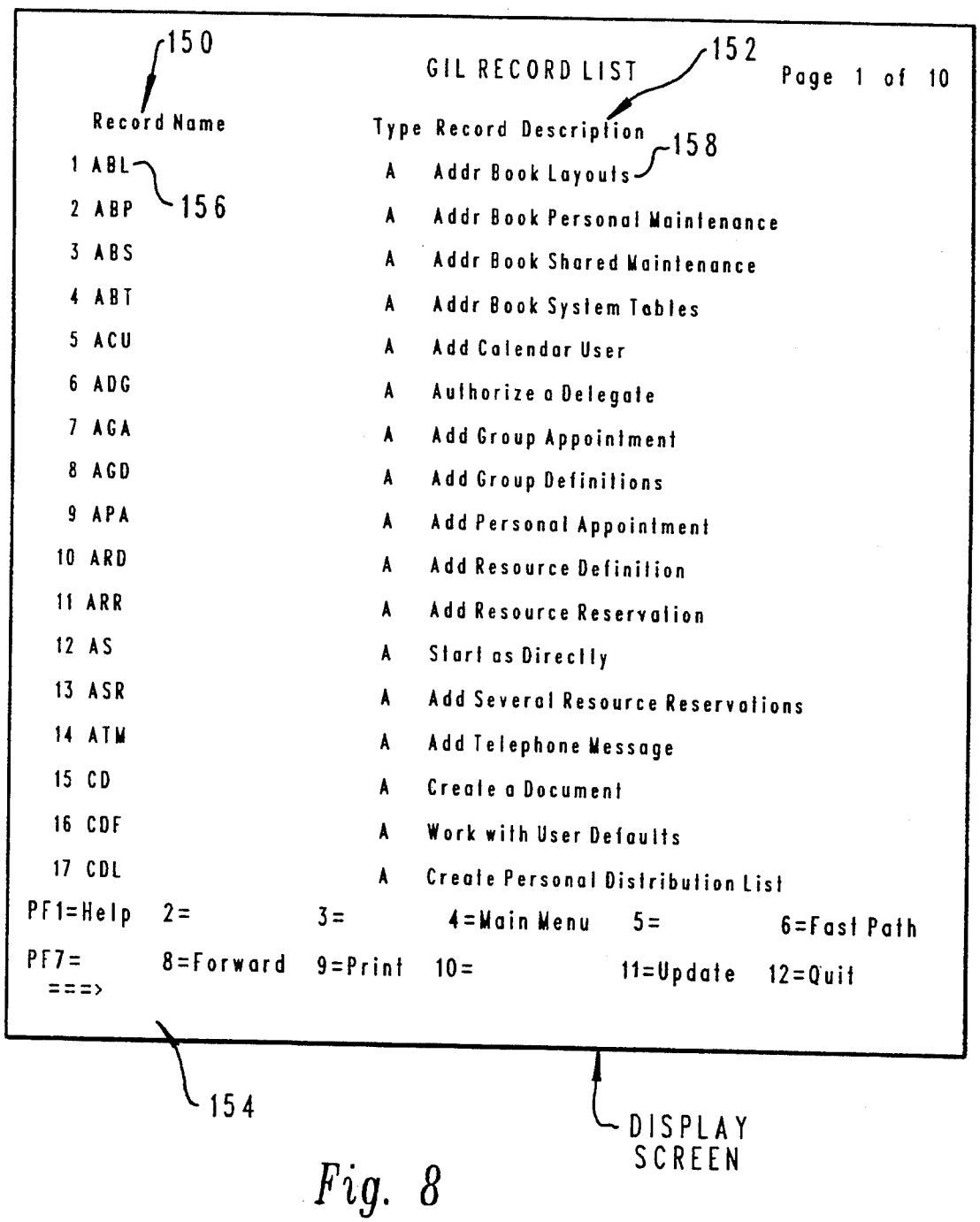

Turning to FIG. 3, a high level flow diagram of how the build verification procedure is automated by this invention is shown. As shown in step 60, a TPNS program is coded to define the network. At step 62, the TPNS program is submitted for execution under control of an operating system. Statements in the TPNS program cause the establishment of a terminal session (logon) in the CICS region as indicated in step 64. After the terminal session has been established, the TPNS program goes to the LGL panel at step 66. Turning again to FIG. 2, the LGL 50 panel is shown containing nine options 53 from which the TPNS program may select. The TPNS program selects the proper entry and enters it 52. Proceeding from the LGL panel, the TPNS program goes to the General Information Library (GIL) list in step 68. Turning to FIGS. 8 and 9, display screens show the information contained on the General Information Library (GIL) Record List. The information contained in the record list is the fast path commands required for build verification. The shorten name for the fast path commands appears under the record name 150. The full name for the fast path command appears in the record description 152. FIG. 8 shows the first of the ten pages containing fast path commands while FIG. 9 shows the second of ten pages. Referring now to FIG. 9, during build verification testing, the TPNS program enters the number appearing under the record name 150 column. For example, to test the fast path command for the "create a note" 162 panel, the TPNS program enters "21" 160 on the command line 154. This causes the panel in FIG. 10 to appear. FIG. 10 is the end user's panel used for creating notes and represents the fast path command "CN". If the panel in FIG. 10 does not appear, an error message would appear instead. Returning to FIG. 3 and the test procedure, set counter is forced to zero before build verifications testing is begun. The TPNS program test for a fast path command at step 72. If no fast path commands are encountered, TPNS causes the terminal session in CICS to end by performing a logoff operation at step 74.

However, if fast path commands are found to exist at step 72, set counter is incremented at step 76, and testing continues. The TPNS program continues by keying in a counter value on the command line at step 78. If the fast path command is found to be functional, a branch occurs to step 72 to check if additional fast path commands are left to be tested. If the fast path command is found to be in error at step 80, the TPNS program writes an error message at step 82 and causes a branch to check to see if additional fast path commands remain to be tested at step 72.

Figure 4:
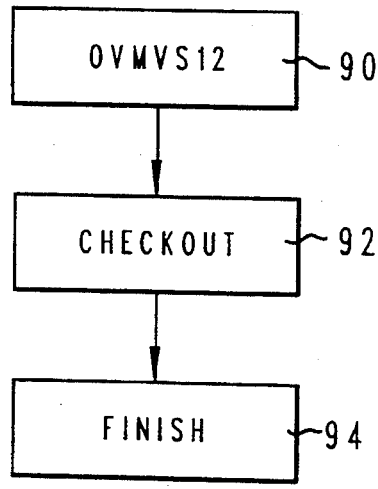
FIG. 4 is a block diagram of the Teleprocessing Network Simulator (TPNS) modules needed to automate the fast path commands build verification procedure.

Turning to FIG. 4, a block diagram is shown of the TPNS program modules executed to automate the repetitive tasks of fast path verification. The "OVMVS12" module 90 represents the network definition. The contents of the OVMVS12 module 90 is shown in TABLE 1. The "CHECKOUT" module 92 represents the panels/options that will be tested during the execution of the TPNS program. Finally, the "FINISH" module 94 describes the activities required to terminate testing of a build process. The CHECKOUT module 92 of the TPNS program will now be described in further detail.

Figure 5:
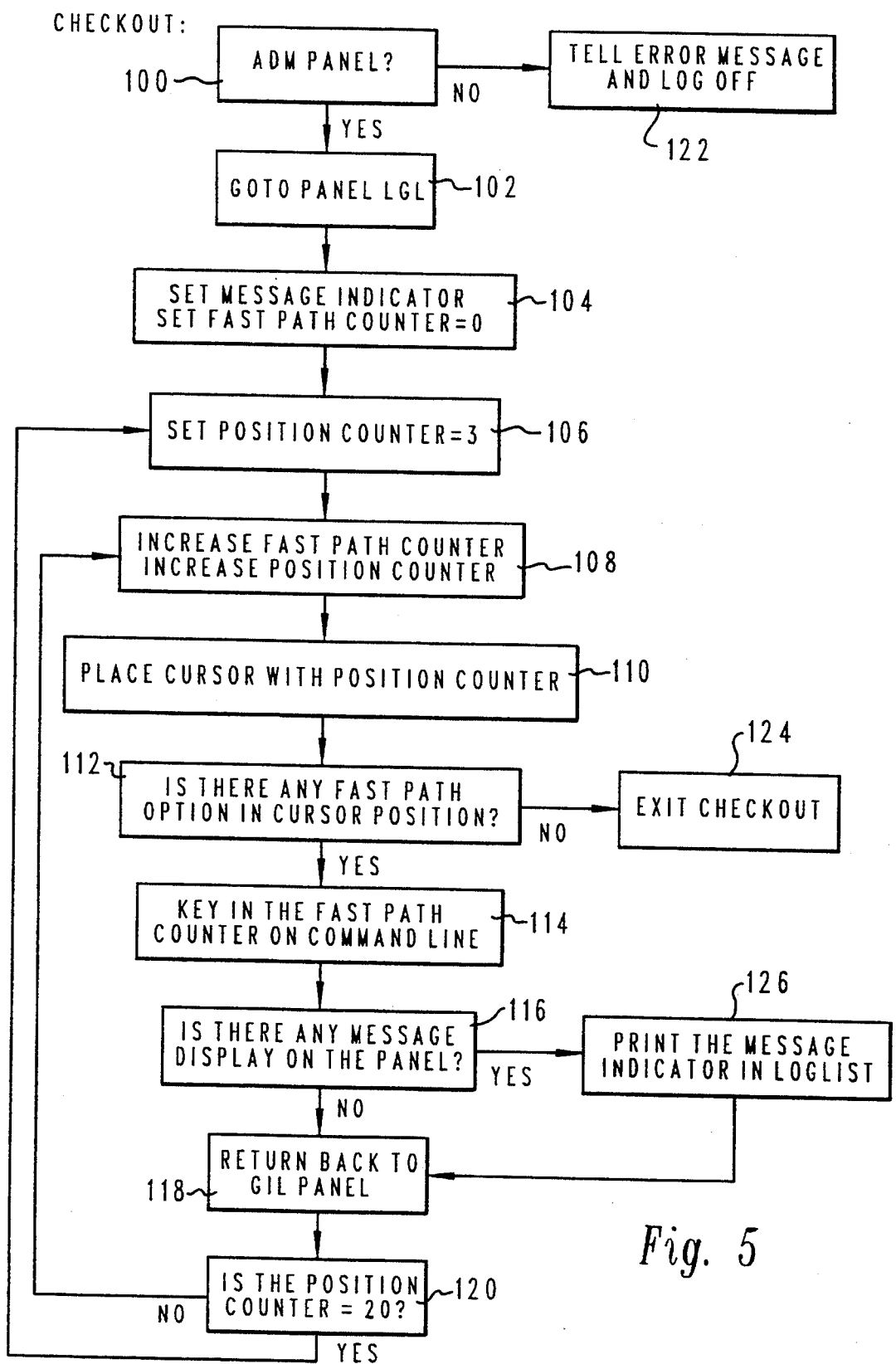
FIG. 5 is a flow chart of the steps taken within the TPNS CHECKOUT module automating the fast path commands build verification procedure.

Referring now to FIG. 5, the CHECKOUT module of the TPNS program will be described. The administrator (ADM) panel, as indicated at step 100, will be located by the TPNS program. If the initial panel cannot be found, an error message will be posted and the TPNS program will cause the session to be terminated (logoff) as shown in step 122. The administrator (ADM) panel is shown in FIG. 7. It is the first panel of an OfficeVision/Multiple Virtual Support session and serves as an entry point for the TPNS program. If no error message is generated by the logon operation, the TPNS program proceeds to the LGL panel as shown in step 102. The TPNS program will set the error message indicator to zero as well as the fast path counter as indicated at step 104. The set position counter will be set to three as indicated at step 108. This is done because the first fast path command ABL 156 is three lines down from the top of the screen. The TPNS program will then place the cursor with the position counter (line 3) and check to see if a fast path command is found as indicated in step 112. If a fast path command is found, the TPNS program will key in the fast path command on the command line as shown in step 114. If no error conditions results from the execution of the fast path command, control will be returned to the General Information Library (GIL) panel as indicated at step 118, a test will then be made to see if the position counter is equal to 20 which indicates the last fast path command on a page as shown at step 120. If the position counter is not equal to 20, the fast path check will be deemed complete and control will return to step 108 to check other fast path commands on a new page. If the position counter is found to be equal 20 at step 120, control will be returned to step 106 where the position counter will be set to 3 and additional fast path checking will be conducted. Returning to step 112, if the TPNS program finds no fast path option at the cursor position, the program will call for an exit to the CHECKOUT module as shown in step 124. Returning again to step 116, if an error message should result from testing a fast path command, an error message will be printed in the loglist for later review by the tester as shown in step 126. After printing the message in the loglist, control will return from step 126 to step 118 where a return to the previous panel is executed. Table 2 represents typical program statements required to perform the previously described steps.

Figure 6:
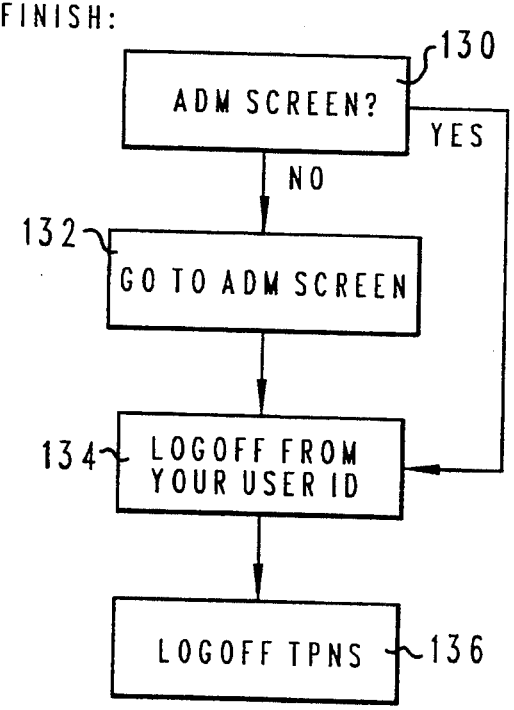
FIG. 6 is a flow chart of the steps taken within the TPNS FINISH module automating the fast path commands build verification procedure.

Finally, turning to FIG. 6, the FINISH module of the TPNS program will be described. The ADM screen will be recalled as indicated at step 130. If the screen appears the TPNS program will logoff or terminate the session as shown in step 134. This will also terminate the TPNS program as indicated at step 136. If the ADM screen does not appear, another attempt will be made to recall the screen as shown in step 132. If successful, the TPNS program will terminate the session as shown in steps 134. Table 3 represents typical program statement required to perform these steps.

In summary, this invention discloses a method of automating the build verification procedures for panels executable in a Multiple Virtual Storage (MVS) environment which contain fast path commands. A terminal network simulation tool is used to create a model of the panels/options to be verified. The network simulation tool is used to establish a multiple virtual storage terminal session linked to the model. The sequential application of a plurality of fast path commands is then applied against the model and the results recorded.

While the invention has been particularly shown and described with reference to preferred embodiments thereof, it will be understood by those skilled in the art that various changes in form and details may be made therein without departing from the spirit and scope of the invention.

```
*********************************************
* UTBL # 1 - User Ids. Entry 0 is a dummy id,   *
* Entries 1 - 3 are Administrator Ids,          *
* Entries 4 - 6 are Advanced User Ids,          *
* Entries 7 - 8 are Basic User Ids.             *
*********************************************1
```

```
UTBL (DUMMY),(CTADM01),(CTADM02),(CTADM03),
     (CTADV01),(CTADV02),(CTADV03),
     (CTBAS01),(CTBAS02),(CTBAS03)

***********************************************************
* UTBL # 2 - Passwords.                                    *
***********************************************************2

UTBL (DUMMY),(CTADM01),(CTADM02),(CTADM03),
     (CTADV01),(CTADV02),(CTADV03),
     (CTBAS01),(CTBAS02),(CTBAS03)

***********************************************************
* UTBL # 3 - User Initials.                                *
***********************************************************3

UTBL (DUMMY),(C1),(C2),(C3),
     (A1),(A2),(A3),
     (B1),(B2),(B3)

***********************************************************
* UTBL # 5 - Disoss Address.                               *
***********************************************************5

UTBL (DSVOV610) DISOSS ADDRESS
***********************************************************
* UTBL # 6 - FAST PATH COMMANDS (APPLICATIONS SERVICES)*
* UTBL # 7 - FAST PATH COMMANDS (PERSONAL SERVICES)    *
* UTBL # 8 - FAST PATH COMMANDS (CALENDAR)             *
* UTBL # 9 - (ADMINISTRATOR OPTIONS)                   *
* UTBL # 10 - (USER OPTIONS)                           *
* UTBL # 11 - (EDITOR COMMANDS)                        *
***********************************************************

***********************************************************
* APPLICATION SERVICES FAST PATH COMMANDS                  *
* UTBL # 6                                                 *
***********************************************************
```

```
*  0  1  2  3  4  5  6   UTBL (DUM),(ADM),(ASM),(COR),(CUP),(LGD),
*  6  7  8  9 10               (LPT),(LTE),(MAF),(MDS),(MLA),
* 11 12 13 14 25               (MSK),(MUD),(WLM),(AS),(CED),
* 16 17 18 19 20               (CPW),(GR),(LMF),(LR),(LST),
* 21 22 23 24 25               (MBB),(MDW),(MSD),(MTE),(QMF),
* 26 27                        (WND),(AOM),(AEM)

*******************************************************
* PERSONAL SERVICES FAST PATH COMMANDS                 *
* UTBL # 7                                             *
*******************************************************

*  0  1  2  3  4  5  7   UTBL (DUM),(ADG),(CDF),(CKY),(CN),(CPF),
*  6  7  8  9 10               (CPW),(CXR),(ID),(MPS),(PFC),
* 11 12 13 14 15               (PSA),(VPA),(WA),(WD),(WF),
* 16 17 18 19 20               (WIB),(WPF),(WS),(WSB),(CD),
* 21 22 23 24 25               (CDL),(CM),(CPA),(CPT),(CQD),
* 26 27 28 29 30               (FLD),(LDG),(PAI),(PPA),(SDG),
* 31 32 33 34 35               (VSA),(WAI),(WDL),(WFC),(WP),
* 36 37 38                     (WPT),(WSL),(WTG)

*******************************************************
* CALENDAR FAST PATH COMMANDS                          *
* UTBL #8                                              *
*******************************************************

*  0  1  2  3  4  5  8   UTBL (DUM),(ACU),(AGD),(ARD),(ASR),(FTS),
*  6  7  9 10                  (HO),(LGA),(LO),(LRD),(MCL),
* 11 12 13 14 15               (MRR),(PAM),(RRM),(SO),(WGA),
* 16 17 18 19 20               (WRR),(AGA),(APA),(ARR),(ATM),
* 21 22 23 24 25               (LCU),(LGD),(LPA),(LRR),(MPA),
* 26 27 28 29 30               (NN),(PP),(SAM),(TMM),(WPA),
* 31                           (GAM)

*******************************************************
* ADMINISTRATOR OPTION COMMANDS                        *
* UTBL #9                                              *
*******************************************************
```

```
*  0 1 2 3 4 5 9  UTBL   (DUM),(DEL),(ESC),(MM),(P),(RSL),
*  6 7 8 9               (RSA),(V),(WUD),(X),
* 10                     ( )

*********************************************************
* USER OPTION COMMANDS                                   *
* UTBL #10                                               *
*********************************************************

*  0 1 2 3 4 5 10 UTBL  (DUM),(C),(CAN),(CDS),(CLI),(CRP),
*  6 7 8 9 10            (DEL),(DLD),(ESC),(EX),(FIL),
* 11 12 13 14 15         (FND),(GTP),(LA),(MM),(P),
* 16 17 18 19 20         (OP),(R),(RTV),(RWM),(RWN),
* 21 22 23 24 25         (S),(STO),(SVP),(SWN),(V),
* 26 27 28 29 30         (VFY),(X),(SFE),(SFM),(SFR),
* 31                     ( )

*********************************************************
* EDITOR COMMANDS                                        *
* UTBL #11                                               *
*********************************************************

*  0 1 2 3 4 5 11 UTBL  (DUM),(SF),(DOWN),(UP),(SB),(ITEM),
*  6 7 8 9 10            (LINE),(PF),(PB),(PAGE),(PG),
* 11 12 13 14 15         (TOP),(BOTTOM),(BOT),(SR),(SL),
* 16                     (COL)
*********************************************************
* Path SOADM01 - Sign-on as Administrator                *
*********************************************************

SOADM01 PATH SOADM01

*********************************************************
* Path FINISH - Sign-off and enter CSSF LOGOFF           *
*********************************************************

OFF PATH FINISH

*********************************************************
```

```
OVTPNS33 VTAMAPPL CICS01 LU
SEQ=01,QUIESCE=NO,RSTATS=YES,
    PATH=(SOADM01,
      CHECKOUT,
      OFF)
```

TABLE 2

```
CHECKOUT MSGTXT
     WTO ($MSGTXTID$ Running...)

*************************************************
* TPNS note:                                     *
* This TPNS script was created by Adrienne Lee   *
* (Dept. 51Y, T/L 522-3318).                     *
*************************************************

* TPNS: This script should be run on an administrator
         userid.
* Make sure this TPNS script starts on the main menu panel.

IF LOC=(1,2),WHEN=IMMED,TEXT=(ADM),ELSE=BERR-SCR
IF LOC=(1,2),WHEN=IMMED,TEXT=($UTBL,13,F0$),ELSE=BERR-SCR

CURSOR ROW=24,COLUMN=07
     TEXT (5 6)
     ENTER
     STOP

CURSOR ROW=24,COLUMN=07
     TEXT (7)
     ENTER
     STOP

CURSOR ROW=24,COLUMN=07
     TEXT (6)
     ENTER
     STOP

TEXT (6)
```

```
        ENTER
        STOP

IF LOC=(4,4),WHEN=IMMED,TEXT=(1),ELSE=BERR-SCR

SET DC2=65535
    SET DSEQ=0
    SET TSEQ=3
    NEXT LABEL
    SET DSEQ= + 1
    SET TSEQ= + 1

CURSOR ROW=TSEQ,COLUMN=06

IF LOC=C+0,WHEN=IMMED,TEXT=(DXB),THEN=B-NEXT

CURSOR ROW=TSEQ,COLUMN=02

IF LOC=C+0,WHEN=IMMED,TEXT=(PF1),THEN=B-NEXTPG
IF LOC=C+0,TEXT=($CNTR,DSEQ$),WHEN=IMMED,SCAN=6,ELSE=
   B-NEXTPG

CURSOR ROW=24,COLUMN=07
    TEXT ($CNTR,DSEQ$)
    EREOF
    ENTER

IF LOC=(24,11),TEXT=($DUP,20$)WHEN=IMMED,SCAN=20,ELSE=
   B-EXIT
Check if there is any message.

CURSOR ROW=TSEQ,COLUMN=01

IF LOC=C+0,TEXT=($CNTR,DSEQ$),WHEN=IMMED,SCAN=10,ELSE=
   B-CHECK1

LOG ($CNTR,DC2$)
    WTO (ERROR MESSAGE ON $CNTR,DSEQ$)

BRANCH LABEL=NEXT
```

```
        CHECK1 LABEL

IF LOC=(3,2),TEXT=(<--),WHEN=IMMED,SCAN=240,ELSE=B-CHECK2

PF3
    STOP
    CURSOR ROW=TSEQ,COLUMN=01

IF LOC=C+0,TEXT=($CNTR,DSEQ$),WHEN=IMMED,SCAN=10,THEN=B-NEXT
IF LOC=(3,2),TEXT=(<--),WHEN=IMMED,SCAN=240,THEN=B-CHECK1

CHECK2 LABEL

IF LOC=(21,1),WHEN=IMMED,SCAN=160,TEXT=(4=),ELSE=B-CHECK3

PF12
    STOP
    CURSOR ROW=TSEQ,COLUMN=01

IF LOC=C+0,TEXT=($CNTR,DSEQ$),WHEN=IMMED,SCAN=10,THEN=B-NEXT

BRANCH LABEL=CHECK2
    CHECK3 LABEL
    PF4
    STOP
    CHECK4 LABEL
    CURSOR ROW=TSEQ,COLUMN=01

IF LOC=C+0,TEXT=($CNTR,DSEQ$),WHEN=IMMED,SCAN=10,THEN=B-NEXT

BRANCH LABEL=EXIT
    NEXTPG
    LABEL

IF LOC=(22,1),WHEN=IMMED,SCAN=50,TEXT=(8= ),THEN=B-EXIT1

PF8
    STOP
    SET TSEQ=3
```

```
        SET DSEQ=1
        BRANCH LABEL=NEXT
        EXIT1 LABEL
        PF4
        STOP

IF LOC=(01,02),WHEN=IMMED,TEXT=(ADM),ELSE=BERR-SCR
IF LOC=(1,2),WHEN=IMMED,TEXT=($UTBL,13,F0$),ELSE=BERR-SCR

TPNS: ALL TPNS SCRIPTS WILL END ON MAIN MENU OF FIRST USER
      SIGNED-ON

WTO ($MSGTXTID$ Finished)
    EXIT
    ENDTXT
FINISH MSGTXT
```

TABLE 3

```
*************************************************************
* "PERSONAL SERVICES/370 SIGN-OFF"                           *
* ACTION PF4                                                 *
* SELECTED FROM MAIN MENU                                    *
*************************************************************
LOGOFF LABEL
    WTO ($UTBL,1,CD1$ SIGNING OFF)
    AGAIN LABEL
    IF
LOC=B+0,WHEN=IMMED,SCAN=YES,TEXT=(DXB1011),THEN=B-EXIT

IF
WHEN=IMMED,LOC=B+0,SCAN=YES,TEXT=(DFH),THEN=CONT,
    ELSE=B-CHECK
    WTO (ERROR: ABEND)
    BRANCH LABEL=DONE

CHECK LABEL
    IF
WHEN=IMMED,LOC=B+0,SCAN=YES,TEXT=(4=Main),THEN=B-MAIN
    IF
```

```
    WHEN=IMMED,LOC=B+0,SCAN=YES,TEXT=(12=Quit),THEN=B-QUIT
        IF
    WHEN=IMMED,LOC=B+0,SCAN=YES,TEXT=(3=END),THEN=B-END
        IF
    WHEN=IMMED,LOC=B+0,SCAN=YES,TEXT=(3=File),THEN=B-END
        WTO (i can't finish--Help!!)
        BRANCH LABEL=DONE
*------------------------------------------------------------*

MAIN PF4
    STOP
    BRANCH LABEL=AGAIN

QUIT PF12
    STOP
    BRANCH LABEL=AGAIN

END PF3
    STOP
    BRANCH LABEL=AGAIN

*------------------------------------------------------------*

EXIT WTO ( )
    WTO (**********************)
    WTO ($UTBL,1,CD1$ SIGNED OFF)
    WTO (**********************)
DONE LABEL
* relogon to stop being logged on ay another terminal.
    CALL NAME=SIGNON
    WTO (USER SIGNED OFF AGAIN AND NOW QUIESCED)

PF12
    STOP

CALL NAME=DEFC065
```

```
* logoff and QUIESCE CURRENT USER, AND decrease count by 1
    CLEAR
    WAIT TIME=5000
    TEXT (CSSF LOGOFF)
    ENTER
    SET NSEQ=1
    IF LOC=NSEQ,WHEN=IMMED,TEXT=0,THEN=B-ZEND

QUIESCE

ZEND LABEL
    OPCMND (ZEND)
    QUIESCE

ENDTXT
```

What I claim is:

1. A method of testing an application program on a host processor, wherein a build verification process is applied to invoke panels for a user of said application program executing with a database management program, comprising:

loading and executing a network simulation program by said user on said host processor, said simulation program providing a simulation of said network with which said database program interacts;

establishing a terminal session in said database management program and controlling said application program by said network simulation program, said database management program operating to prevent an error within said application program from prematurely terminating said simulation; and accessing said application program by said simulation program and applying at least one record list containing said build verification process to invoke panels in said application program for said user.

2. A method of testing an application program on a host processor as recited in claim 1 wherein said accessing step includes the step of recording an error message by said simulation program when the record list cannot be applied to said application program.

3. A method of testing an application program on a host processor as recited in claim 2 wherein said error message is written to a loglist for viewing by said user.

4. A method implemented in a data processing system for automating a build verification procedure for an application program undergoing testing on a host processor, comprising:

loading a first program by a user on said host processor for managing a network of resources accessible by said user of said application program;

loading said application program by said user on said host processor for build verification;

loading and executing a simulation program by said user on said host processor, said simulation program providing a simulation of said network with which said first program interacts, said simulation program linking to said first program and said application program, said simulation program without intervention by said user automatically applying a plurality of record lists including said build verification procedure to test said application program by the steps of:

executing said first program to establish a terminal session within said host processor to prevent an error within said application program from prematurely terminating said simulation;

executing said application program within said terminal session and applying said plurality of record lists within said build verification procedure to said application program;

monitoring the operation of said record lists and recording the status thereof by said simulation program; and terminating said terminal session within said first program and said application program to complete testing of said application program.

5. The method as recited in claim 4 wherein said first program comprises a Customer Information Control System (CICS) program.

6. The method as recited in claim 4 wherein said application program comprises an OfficeVision/Multiple Virtual Support (OV/MVS) program.

7. The method as recited in claim 4 wherein said simulation program comprises a Teleprocessing Network Simulation (TPNS) program.

8. The method as recited in claim 4 wherein said record lists include a plurality of fast path commands applied to said application program to invoke display screens thereby checking the operation of said application program.

9. A method of automating a build verification process for an application program undergoing testing on a host processor, wherein said build verification process includes applying a plurality of fast path commands to invoke display screens for a user of said application program, comprising:

loading an application program by said user on said host processor for build verification having a plurality of display screens stored therein;

loading a database management program by said user on said host processor for managing a network of terminals and communications devices and accessing said application program by said user, said database management program containing a list of fast path commands to be applied to test said application program;

loading and executing a terminal and network simulation tool by said user on said host processor, said simulation program providing a simulation of a network with which said first program interacts, said simulation program linked to said application program and said database management program for automatically applying, without intervention by said user, said list of fast path commands to invoke one of said display screens by the steps of:

logging onto said application program and said database management program and establishing a terminal session therein, said database management program operating to prevent an error within said application program from prematurely terminating said simulation;

accessing said list of fast path commands and applying one of said plurality of fast path commands in said database management program to said application program;

monitoring a display screen in said application program invoked by said fast path command and recording the status thereof;

repeating said application and monitoring steps until all of said list of fast path commands are executed; and terminating said terminal session in said application program and said database after said list of fast path commands are executed.

* * * * *